United States Patent Office 3,041,522
Patented June 26, 1962

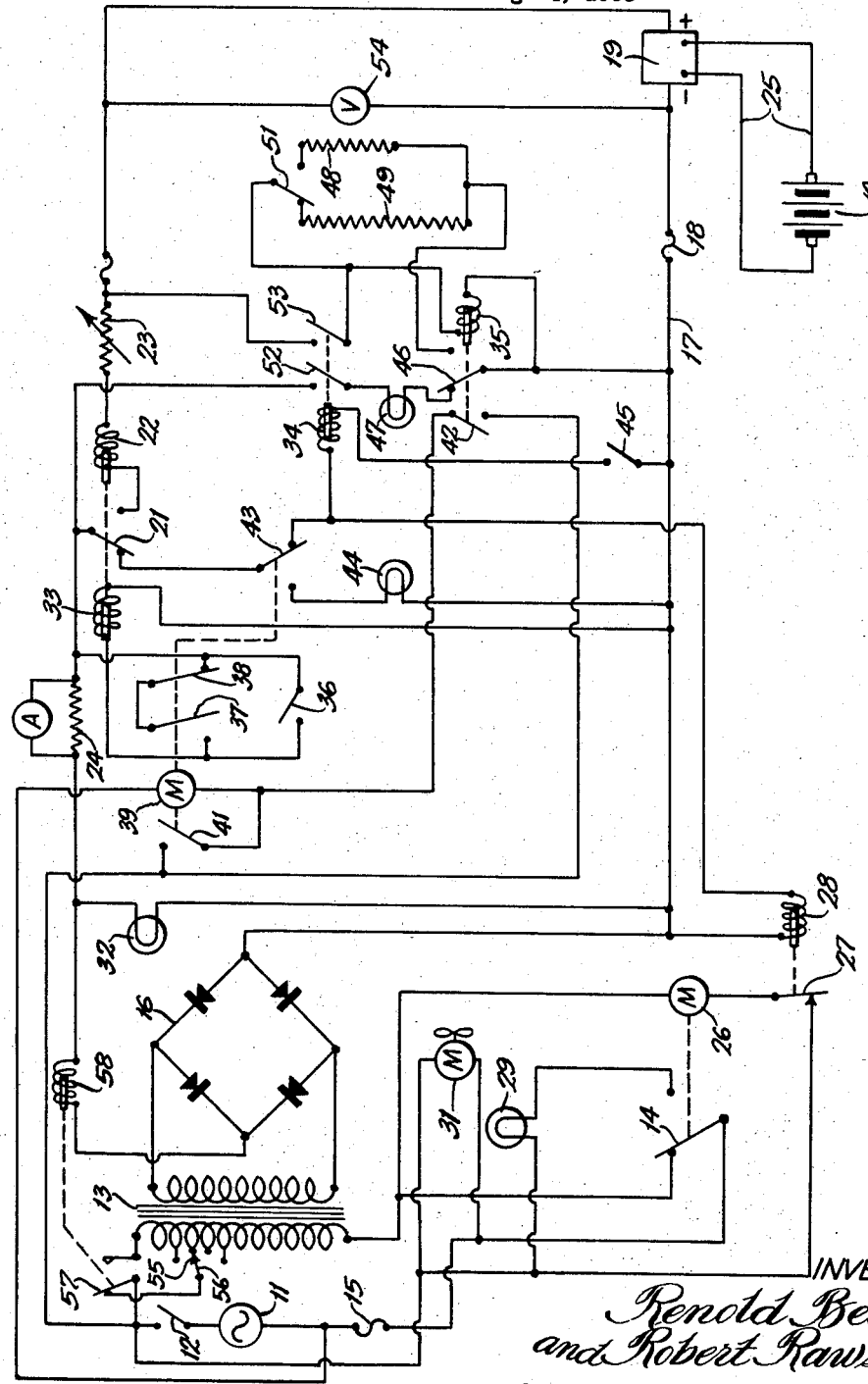

3,041,522
BATTERY CHARGER AND TESTER
Renold R. Beck, Chicago, and Robert E. Rawski, Glen Ellyn, Ill., assignors to Sun Electric Corporation, a Delaware corporation
Filed Aug. 4, 1958, Ser. No. 752,718
3 Claims. (Cl. 320—33)

This invention relates to a battery charger and tester and more particularly to an apparatus for automatically charging and testing the condition of electric storage batteries.

In charging storage batteries heretofore it has generally been assumed that if the battery accepts the charge by coming up to full voltage after being given a predetermined charge, it is in satisfactory condition. It has, therefore, been the general practice to charge the battery and check its condition at the end of the charging operation, either by checking the battery voltage or the specific gravity of the battery solution. Experience has shown that many batteries which satisfactorily accept a charge are not in good condition and will fail after a relatively short period of service. Conventional tests as heretofore performed cannot disclose the true condition of such batteries and are, therefore, not entirely satisfactory where the batteries are placed in relatively critical service.

It is accordingly an object of the present invention to provide a battery charger and tester which will automatically charge a battery and test it sufficiently to disclose its true condition.

According to a feature of the invention, the charging operation is discontinued after the charging rate falls below a predetermined value, except that if this is not accomplished in a predetermined time, charging is discontinued and a signal is operated to indicate that the battery is not in good condition.

Another object of the invention is to provide a battery charger and tester in which the battery is first charged and is then connected to a predetermined discharging load through which it is discharged to test its condition.

According to a feature of the invention, the battery is disconnected from the discharging load and a signal is operated to indicate that the battery is not in good condition if its voltage output falls below a predetermined value while connected to the load. If the discharge test indicates that the battery is in good condition, it is disconnected from the load and reconnected to the charging source to bring it back up to full charge.

A still further object is to provide a battery charger and tester in which the charging voltage is automatically adjusted to prevent an excessive charging rate.

The above and other objects and features of the invention will be more readily apparent from the following description when read in connection with the accompanying drawing in which the single FIGURE is a circuit diagram of a charging and testing apparatus embodying the invention.

In the charging and testing apparatus as illustrated, a battery to be charged, as indicated at 10, is connected to a source of D.C. charging current at a voltage slightly in excess of the normal battery voltage so that charging current will be forced through the battery. As shown, the source is powered from a conventional A.C. power supply indicated at 11, which may be the usual 60 cycle commercial supply to which the unit is connected by a suitable plug. The power supply is connected through a main control switch 12, which is manually operated to turn the unit on to the primary winding of a transformer 13, which will convert the supply voltage to approximately the desired charging voltage. The other side of the primary winding is connected back to the source through a two position switch 14, which normally occupies the position shown to complete the circuit to the transformer primary. A suitable fuse 15 may be provided in the circuit to protect it against over-loads.

The secondary winding of the transformer 13 is connected to a full wave rectifier 16 which will convert the transformer secondary voltage to direct current for charging the battery. The rectifier is connected at one side of its output circuit to a lead 17, which may be fused as shown at 18, and which leads to an output terminal box 19. The other side of the rectifier is connected through a two position switch 21, a current relay 22, an adjustable resistor 23, and an ammeter circuit indicated generally at 24 to the terminal box 19. Suitable leads 25 extending from the terminal box may be provided with clips or other desired connectors for connection to the battery as illustrated.

The A.C. power source also energizes a timing motor 26, which may be a synchronous motor and which is mechanically connected to the switch 14 to reverse its position after a predetermined time interval. As shown, the motor 26 is connected to one side of the power source through a switch 27 operated by a relay 28. The switch 27 is normally closed and is open when the relay 28 is energized. It will be noted that the circuit for the timing motor 26 goes through the switch 14 in its normal position, so that when the motor throws the switch 14 after a predetermined time interval, the motor will be stopped. When the switch 14 is in its thrown position, it will energize a signal illustrated as a lamp 29, which will indicate to the operator the condition of the battery. The A.C. power circuit may also energize a fan driving motor 31, which operates a fan to circulate cooling air over the apparatus.

When the switch 12 is closed to start the charging operation, a signal light 32 connected directly across the output of the rectifier will indicate that the apparatus is in operative condition and that charging voltage is available.

The charging operation is controlled by the current relay 22, which is in series in the charging circuit, the relay 28, and three additional relays 33, 34 and 35. The current relay 22 and the relay 33 both control the two position switch 21. When the current through the relay 22 exceeds a predetermined value, it will hold the switch 21 in its right-hand position in which a circuit is completed from the rectifier to the output terminal box 19, and when the current through the relay 22 falls below the predetermined value, the switch 21 will be moved to the position shown. When the relay 33 is energized, it will move the switch back to the right to complete the charging circuit.

The relay 33 is controlled by a manual resetting switch 36 and by a pair of switches 37 and 38 connected in series. The switches 37 and 38 are operated by a second timing motor 39 which may also be a synchronous motor and which is connected to the A.C. source through the starting switch 12 and through a holding switch 41 operated by the motor 39 or a switch 42 operated by the relay 35 and in parallel with the holding switch 41.

The motor 39 also operates a two position switch 43, which is normally in the position shown during a charging operation and which is moved to its other position at the end of the charging operation as described hereinafter. In the illustrated position, the switch 43 controls an energizing circuit for the relays 28 and 34 and in its moved position, the switch 43 will complete an energizing circuit for a signal lamp 44. A manual switch 45 may be provided in series with the relay 34 and may be opened to eliminate the discharge test when desired.

The relay 35 also controls a two position switch 46 which is normally in the position shown in circuit with a signal light 47 and which is moved to its other position when the relay 35 is energized to connect in circuit a pair of discharge load resistors 48 and 49. The resistors 48 and 49 are of different values to correspond to the desired discharging load for different types of batteries and may be selectively connected in the circuit by a selector switch 51.

The relay 34 operates a pair of single pole switches 52 and 53 which are normally open as shown and which are closed when the relay 34 is energized. The switch 52 is in circuit with the signal lamp 47 in series with the switch 46, and the switch 53 is in circuit with both the relay 35 and the load resistor selector switch 51. A volt meter 54 may be connected across the charging circuit as shown to indicate the voltage being supplied to the battery.

In order that the output voltage of the rectifier and consequently the voltage supplied to the battery can be regulated, the primary of the transformer 13 is provided with a series of taps 55 at different points in its length and a wiper 56 is movable over the taps to select the effective number of primary turns. The wiper 56 is connected to the source of alternating current 11 through a two-position switch 57, one contact of which is connected to the main switch 12. The switch 57 normally occupies the position shown in which it connects the wiper 56 to the source but is movable to a second position in which it connects the source to the outer end of the primary winding. In this position of the switch all of the turns of the primary winding are in circuit so that the secondary voltage will be at a minimum and minimum voltage will be supplied to the battery.

The switch 57 is controlled in response to flow of charging current to the battery. For this purpose a current relay 58 is connected in the main circuit from the rectifier to the battery to operate the switch 57. The relay may be adjusted to throw the switch from its normal position as shown to its right-hand position in response to a predetermined maximum charging current such, for example, as 26 amperes, and will be deenergized to permit the switch 57 to return to its normal position when the charging current reaches a predetermined lower value such, for example, as 15 amperes.

To carry out a charging and testing operation with the apparatus as described, a battery to be charged and tested is connected through the leads 25 to the output terminal box 19 as shown and the main switch 12 is closed to initiate the operation. The timing motors 26 and 39 are reset to their respective initial positions and the switch 27 is closed to start the timing motor 26. The switch 36 is then momentarily closed to throw the switch 21 to its right-hand position and to complete the charging circuit from the rectifier through the battery. The ammeter in the ammeter circuit 24 will indicate the charging rate with the charging voltage being shown by the volt meter 54. The resistor 23 may be adjusted at this time to set the desired charging voltage and charging rate.

Initially the switch 57 will be in the position shown to connect the alternating current source to a selected one of the taps 55 on the transformer primary and the wiper 56 may be adjusted to produce the desired charging voltage. In the event the charging voltage exceeds the desired maximum such as 26 amperes the current relay 58 will move the switch to its right-hand position to connect all of the primary turns in circuit. This will reduce the charging voltage to reduce the charging current to a desirable safe value. As soon as the charging current falls below approximately 15 amperes the relay 58 will be deenergized and the switch 57 will return to its normal position. At this time the higher charging voltage for which the wiper 56 is adjusted will be supplied to the battery to increase the charging rate.

If during the initial charging period the battery comes up to full charge as indicated by reduction in flow of current through the current relay 22, the relay 22 will move the two position switch 21 to its left-hand position as illustrated. In a typical charging operation for a 24-volt battery, this will occur when the current through the current relay 22 drops below about 4 amperes. If the current has not dropped to this value within the time for which the timing motor 26 is set, which may be a period of about 3 hours, the timing motor will throw the switch 14 to its right-hand position energizing the signal light 29 to indicate that the battery has failed to accept the charge. Opening of the left-hand contact of the switch 14 will interrupt the transformer primary circuit and will interrupt flow of charging current. The operator will, therefore, be informed by lighting of the signal light 29 that the battery is defective and the charging operation will be discontinued.

Assuming that the battery accepts the charge and that the current relay 22 moves the switch 21 to its left-hand position shown, a circuit will be completed through switch 21 and switch 43 to energize the relay 34, assuming that the switch 45 has been closed to effect the discharge test. At the same time a circuit will be completed through switches 21 and 43 to the relay 28 to open the switch 27 and stop the timing motor 26, the switch 27 remaining open until it is manually reset. As soon as the relay 34 is energized, it will close the switches 52 and 53 and the relay 35 will be energized through the switch 53 to close the switch 42 and throw the switch 46 to its right-hand position. The switch 42 will complete a circuit through the second timing motor 39 to start it in operation, and the switch 46 will complete a circuit from the battery through the selected discharge resistor 48 or 49 and through the switch 53. At this time the battery will start discharging through the selected load resistor and the charging circuit to the battery will be interrupted at the switch 21.

If at any time during the discharge test the battery voltage falls below a predetermined value, for example, about 19 volts in the case of a 24 volt battery, the relay 35 which is voltage sensitive will deenergize, opening the switch 42 and moving the switch 46 to its left-hand position as shown. The switch 46 will complete a circuit through the signal lamp 47 and switch 52, which is still closed so that the signal lamp 47 will indicate to the operator that the battery has failed the discharge test. Movement of the two-position switch 46 will interrupt the battery discharge circuit so that it will not be further discharged and opening of the switch 42 will interrupt the circuit to the motor 39, which has not yet closed the holding switch 41.

Assuming that the battery voltage stays above the desired minimum during the discharge test, which may be continued for a period of approximately two hours to discharge the battery almost completely, the timing motor 39 will operate its series of switches to complete the charging and testing operation. The first switch to be operated is the holding switch 41 which will be closed by the timing motor a very short interval before the end of the discharging cycle. In the case of a two hour discharge cycle, the switch 41 will be closed at the end of about one hour and 58 minutes. At about the same time the timing motor 39 will close the switch 37 to complete a circuit through the relay 33, which will be energized to throw the switch 21 back to the right and recomplete the charging circuit from the rectifier through the battery. Shortly after closing of the switch 37 the motor 39 will open the switch 38 to interrupt the circuit to the relay 33, the switch 21 being held in its right-hand position at this time by the current relay 22. At about the same time the timing motor 39 will also move the switch 43 to the left to interrupt the circuit to relay 34 and to connect the signal light 44 in circuit with the left-hand contact of the switch 21.

After this operation, charging of the battery in the same manner as in the initial cycle will continue until the charging current falls to the predetermined low value, indicating that the battery has accepted a full charge. At this time the relay 22 will be operated to move the switch 21 to its left-hand position as shown, and to complete a circuit through the switch 43 and the signal light 44, indicating that the battery is fully charged. It will be noted that the relay 34 will not be energized at this time because its circuit is interrupted through the switch 43 so that when the switch 21 is operated at completion of the second charging operation, the apparatus will remain in the condition described with the signal light 44 lighted until the operator removes the charged battery and replaces it with another battery to be charged.

While one embodiment of the invention has been shown and described, it will be understood that this is for the purpose of illustration only and is not to be taken as a definition of the scope of the invention, reference being had for this purpose to the appended claims.

What is claimed is:

1. A battery charger and tester comprising a source of D.C. charging current, a circuit to connect the source to a battery to be charged, control means operable automatically in response to the rate of flow of current in the circuit after the battery has received a normal charge to disconnect it from the circuit and to connect a predetermined discharging load to it, means responsive to an electrical function of the battery when it is connected to the discharging load to disconnect the battery from the load if said function is below a predetermined value, and time responsive means to disconnect the battery from the discharging load and to reconnect it to the source after a predetermined time interval.

2. A battery charger and tester comprising a source of D.C. charging current, a circuit to connect the source to a battery to be charged, control means operable automatically in response to the rate of flow of current in the circuit after the battery has received a normal charge to disconnect it from the circuit and to connect a predetermined discharging load to it, time responsive means to disconnect the battery from the discharging load and reconnect it to the source after a predetermined time interval, and means responsive to the voltage supplied to the load by the battery and operable if the voltage falls below a predetermined value to disconnect the battery from the discharging load and to stop the time responsive means.

3. A battery charger and tester comprising a source of D.C. charging current, a circuit to connect the source to a battery to be charged, time responsive means to interrupt flow of charging current in the circuit after a predetermined time interval normally sufficient to complete charging of a battery, control means responsive to a predetermined minimum flow of charging current in the circuit to stop the time responsive means, to disconnect the battery from the source and to connect the battery to a predetermined discharging load, second time responsive means to disconnect the battery from the load and reconnect it to the source after a predetermined time interval, and control means responsive to the voltage supplied by the battery to the load and operable if the voltage falls below a predetermined value to disconnect the battery from the load and to stop the second time responsive means.

References Cited in the file of this patent

UNITED STATES PATENTS

| | | |
|---|---|---|
| 1,835,386 | Geiger | Dec. 8, 1931 |
| 2,013,618 | Woodbridge | Sept. 3, 1935 |
| 2,540,174 | Riley | Feb. 6, 1951 |
| 2,582,460 | Salzberg | Jan. 15, 1952 |
| 2,721,969 | Van Ryan et al. | Oct. 25, 1955 |
| 2,756,379 | Von Benthuysen | July 24, 1956 |
| 2,791,749 | Godshalk | May 7, 1957 |